United States Patent [19]

Bertrand

[11] Patent Number: 4,963,867
[45] Date of Patent: Oct. 16, 1990

[54] APPARATUS FOR PACKING PARALLEL DATA WORDS HAVING A VARIABLE WIDTH INTO PARALLEL DATA WORDS HAVING A FIXED WIDTH

[75] Inventor: Keith J. Bertrand, Sunnyvale, Calif.

[73] Assignee: Ampex Corporation, Redwood City, Calif.

[21] Appl. No.: 331,977

[22] Filed: Mar. 31, 1989

[51] Int. Cl.$^5$ .............................................. H03M 7/44
[52] U.S. Cl. ........................................ 341/60; 341/67; 341/87; 364/715.1
[58] Field of Search ................. 341/60, 63, 67, 87, 341/95; 375/122; 370/118; 364/715.01, 715.02, 715.03, 715.1, 200, 900

[56] References Cited

U.S. PATENT DOCUMENTS

| 4,044,347 | 8/1977 | Van Voorhis | 341/67 |
| 4,189,716 | 2/1980 | Krambeck | 341/63 |
| 4,247,891 | 1/1981 | Flynn et al. | 341/63 |
| 4,376,933 | 3/1983 | Saran et al. | 341/67 |
| 5,593,267 | 6/1986 | Kuroda et al. | 341/67 |

Primary Examiner—William M. Shoop, Jr.
Assistant Examiner—H. L. Williams
Attorney, Agent, or Firm—Elizabeth E. Strnad

[57] ABSTRACT

The data packer receives n-bit wide parallel data words, and it outputs m-bit wide packed parallel data words, where n is a variable and may change during the operation, and m is a fixed integer. The input data words are applied to a bit shifter and therefrom to a data output circuit where they are stored until the necessary m bits are obtained. In the preferred embodiment a control circuit which comprises an adder, receives information indicating the number of valid data bits in each input word, and it provides a running sum of the number of received valid data bits. When the number of bits in an input word is equal to or greater than m, the control circuit provides a first control signal which occurs simultaneously with an m-bit wide packed parallel output word provided by the output circuit. Any number of input bits which is less than m is added to a remainder of a previous sum which is also less than m. When the thusly obtained sum is equal to or greater than m, a second control signal is provided which also occurs simultaneously with an m-bit wide packed word provided by the output circuit. The control circuit applies the running sum as a third control signal to the bit shifter, effecting shift of the next received data word by a number of bit positions corresponding to that sum. The number indicated by the third control signal also corresponds to the number of bits currently stored in the output circuit.

9 Claims, 7 Drawing Sheets

APPARATUS FOR PACKING PARALLEL DATA WORDS HAVING A VARIABLE WIDTH INTO PARALLEL DATA WORDS HAVING A FIXED WIDTH

This invention relates to an apparatus for packing data, and more particularly to such apparatus providing conversion of data from n bit wide parallel input words to m bit wide parallel output words, where n is a variable and m is a fixed number.

BACKGROUND OF THE INVENTION

Data received in the form of parallel words of a variable width must be often converted to parallel words of a predetermined fixed width for data packing purposes, as it is known to be utilized for data recording or transmission. Known data packers utilize parallel-to-serial converters, followed by serial-to-parallel converters for conversion of parallel input words of one width to parallel output words of a different width. The serial data conversion utilizes a high frequency serial clock which may exceed the maximum operation frequency of most types of known logic circuitry. In addition, generation of the fast serial clock requires a phase locked loop for synchronization. Such additional circuitry increases the space requirement on the circuit board, as well as cost. For example the well known ECL type logic circuitry may satisfy the high frequency requirement, however it has low packing density on the circuit board or chip, and it also requires a relatively high current power supply. Therefore, the use of ECL logic in the known data packers is not practical where the overall circuit size, cost and/or power are limited. A further disadvantage is that it is relatively difficult to format the data into blocks when utilizing parallel-to-serial conversion because such formatting generally involves inserting additional bits into the serial bit stream, requiring another, higher rate serial clock and the use of high rate first-in, first-out data storage buffers.

SUMMARY OF THE INVENTION

The data packer of the present invention overcomes the above-indicated disadvantages by directly converting a parallel data stream having words of a variable width n into a parallel data stream having words of a predetermined fixed width m, without utilizing parallel-to-serial conversion.

Briefly, in a simplified circuit configuration the data packer receives parallel input words of a variable width of n bits and shifts the words in a bit shifter by a number of bit positions indicated by a control circuit. The data from the bit shifter is applied to an output register and it is stored therein until the width of the packed output data word corresponds to the predetermined fixed width m. The data packer receives a pack ratio, which indicates the number n of valid bits in each input word. The pack ratio is applied to an adder utilized in a control circuit, which provides a running sum of the present and previous pack ratios. The adder provides a summation output corresponding to least significant bits (LSB) of the sum and a carry output corresponding to the most significant bit (MSB). When a carry output is obtained, it coincides with the presence of an m-bit wide output word stored in the output register, and it indicates that the packed data is ready to be taken from the output register. The summation output from the adder represents a binary number applied to the bit shifter, and it causes a new input word to shift in a predetermined direction by a number of bit positions corresponding to the summation output, so that bits from a subsequently received parallel input word are stored in the output register at the next available bit positions.

It is a particular advantage of the data packer in accordance with the invention that it does not employ parallel-to-serial data conversion. In systems that use parallel-to-serial conversion the serial clock rate needed is n-times the input parallel clock rate. In the system of the invention the maximum clock rate needed is n/m rounded up to the nearest integer. The lower clock rate allows the use of slower logic circuits, resulting in lower cost, lower power and higher circuit integration.

In the preferred embodiment the parallel input words are grouped in data blocks. A particular circuit portion is provided to prevent combining data bits from two different consecutive data blocks in the same packed output data word.

In the detailed description examples of operation given include a pack ratio which is maintained constant during operation, as well pack ratios which change during operation from one parallel input word to next.

DETAILED DESCRIPTION

Figure 1:
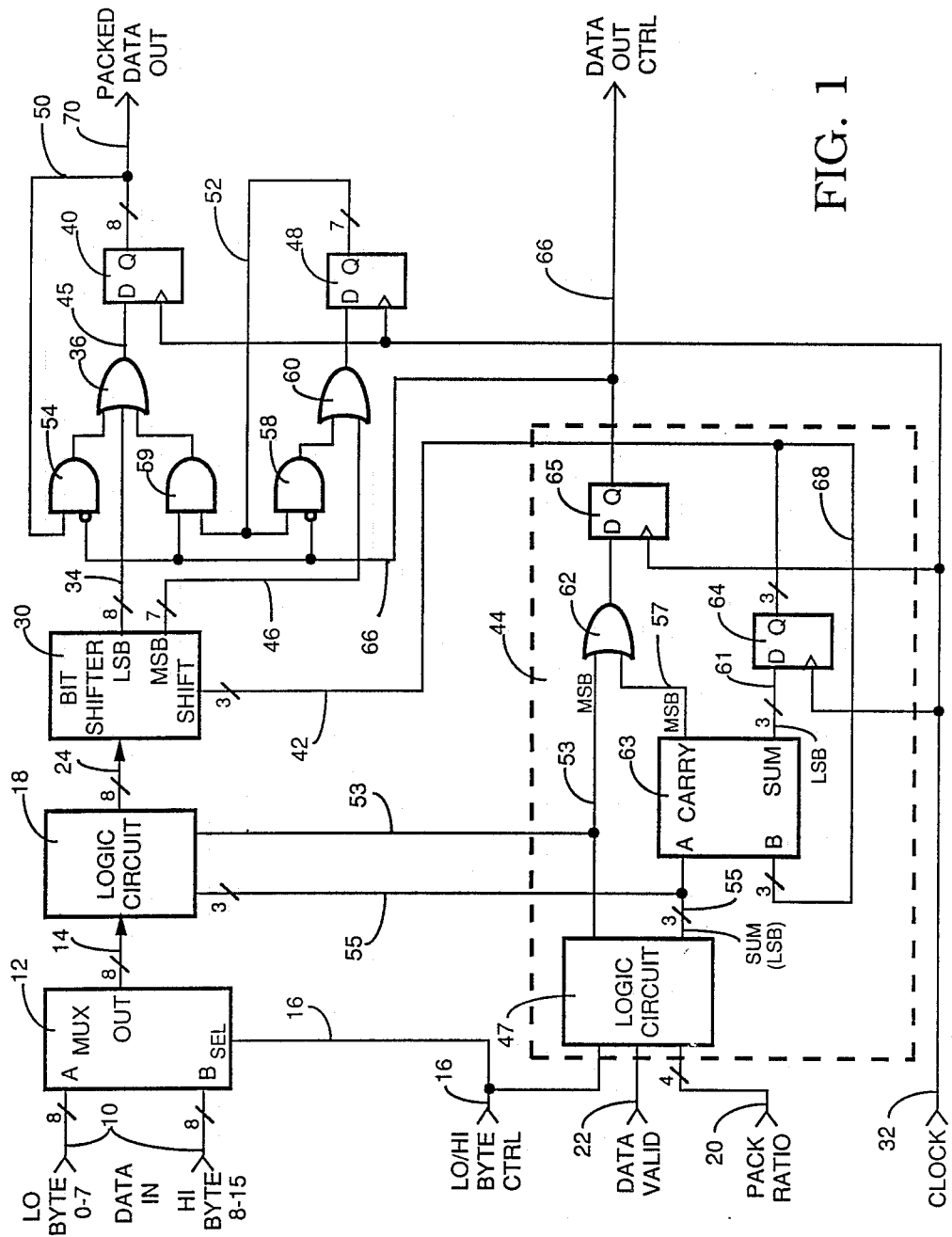
FIG. 1 is a block diagram of a simplified embodiment of the data packer of the invention.

It is noted that in the present description corresponding circuit elements are designated by like reference numerals in all the drawing Figures to facilitate comparison.

An example of the data packer of the invention is described below with reference to the simplified circuit implementation of FIG. 1. In this particular example the input parallel word received by the packer is 11 bits wide, that is the pack ratio is n=11, and the packed output parallel word from the packer is 8 bits wide, that is m=8. The input data word is received on 16 parallel lines 10. Eight of the input lines 10 carry the 8 least significant bits (LSB), also referred to as the low order byte (LO byte). The 8 remaining lines 10 carry the 8 most significant bits (MSB), also referred to as the high order byte (HI byte). As it will follow from further description, by dividing the input word into LO and HI bytes the input data path is limited to a maximum of 8 parallel bits, reducing the amount of logic necessary to implement the circuit. To simplify the description, in this example the selected width n=11 bits of the parallel input word on line 10 is maintained constant during the operation. It is understood however, that the width of the parallel input word is variable, and in this particular embodiment it may vary between 1 and 16 bits.

A first group of 8 parallel lines carrying the LO byte is applied to input A of a 2:1 multiplexer 12, and a second group of 8 lines, representing the HI byte is applied to input B. The multiplexer outputs an 8-bit parallel word on lines 14 alternatively from its A and B inputs, at twice the input data rate, in response to an external LO/HI byte control signal on line 16. In the preferred embodiment the control signal on line 16 is high when the data received at input A of multiplexer 12 is output on line 14, and it is low when the data received at input B is output on line 14. Because n=11 bits, the LO byte received at input A has 8 valid bits, and the HI byte received at input B has 3 valid bits, and its other 5 bits are non-valid. When for example the 11 bit input word is received at a rate of 1 Megaword/sec, that is $11 \times 10$ exp 6 bits/sec, the rate of output data on line 14 from the multiplexer 12 will be 2 Megawords/sec, which in this example is equal to 2 Megabytes/sec. It will be however understood that input words may be received at any rate up to the limit set by the particular type of logic circuitry utilized. In the preferred embodiment which uses CMOS type logic, the parallel data transfer rate within the data packer, for example the rate on line 14, may be as high as 25 Megabytes/sec.

The 8-bit parallel words on line 14 from multiplexer 12 are received by a logic circuit 18, which also receives on lines 53, 55 from a control circuit 44 a binary number indicating the number of valid data bits in each received byte. Based on that information the circuit 18 sets to zero the non-valid bits of each received byte. It will be understood that in applications where the non-valid data bits are set to zero prior to being received on input lines 10, circuit 18 may be deleted. Thus in the present example the logic circuit 18 applies 8 valid bits of the LO byte word on line 24 and subsequently it applies the 3 least significant valid bits of the HI byte word on line 24, while setting the 5 most significant non-valid bits of the HI byte word to zero.

The data from logic circuit 18 is applied on 8 parallel lines 24 to a bit shifter 30. In the preferred embodiment the bit shifter has 15 parallel bit locations, of which 8 represent LSB locations and 7 represent MSB locations. The data from the 8 LSB locations are output on lines 34 and data from the 7 MSB locations are output on lines 46. The bit shifter 30 shifts the data received on lines 24 in the direction of MSB positions by a number of bit positions as indicated by a control signal on line 42 from the control circuit 44, and sets to zero those 7 bits of its 15 output bit locations, which do not contain valid bits. The LO byte on line 24 is clocked into the bit shifter 30 first, followed by the HI byte, which is clocked in during a subsequent clock cycle. The LO byte may be shifted by 0 to 7 bit positions, and a portion thereof which remains after shifting is applied via eight parallel lines 34 and eight OR-gates 36 to an 8-bit parallel output register 40. In FIG. 1 only one gate 36 and a one bit output register 40 is shown for simplicity. The maximum width of the word stored in the register 40 is equal to the width m=8 of the packed data word, and the stored word is output therefrom when all eight bits present in the output register 40 are valid bits, as it will follow from further description. The data is stored in the output register 40 by clocking from its output to its input via line 50, AND-gate 54 (only one is shown for simplicity) and OR-gate 36. When eight valid bits are stored therein, the control signal on line 66 from the control circuit 44 indicates that at the next rising clock edge a packed data byte may be taken from output register 40 on lines 70.

Simultaneously with applying the above-described LSB's on lines 34, the bit shifter 30 also applies up to 7 shifted bits from its MSB locations, via seven parallel lines 46 and OR-gates 60 to a 7-bit parallel intermediate register 48. Only one of each element 60 and 48 are shown for simplicity. The data is stored in the intermediate register 48 in the received order by feeding it back from its output via line 52, and AND-gate 58 (only one of the 7 gates is shown), and OR-gate 60 to its input. When the packed data word is output from the output register 40 on lines 70, as indicated by the presence of the control signal on line 66, as it has been described above, the signal on line 66 simultaneously enables transfer of all the stored bits from the intermediate register 48 to corresponding bit locations in the output register 40 via line 52, an AND- gate 59 and OR gate 36. Because a maximum of only 7 bits may be transferred from the intermediate register to the output register, the data is not ready to be output therefrom until at least the next clock cycle, when the remaining one or more bits will be transferred to the output register from the bit shifter 30. The next byte of data on line 24 will be shifted in the bit shifter by a number of bits indicated by the summation output control signal on line 42, which number is provided by the control circuit 44. That number also corresponds to the number of bits presently stored in the output register 40, as it will follow from further description.

Now the control circuit 44 of FIG. 1 will be described, which provides the control signals on lines 53, 55, 42 and 66. A logic circuit 47 receives the previously described LO/HI byte control signal on line 16, indicating presence of the LO or HI byte of the input word on line 14. It further receives a control signal on line 20, indicating the pack ratio, which in this example is n=11, and a data valid control signal on line 22 indicating whether the present byte on line 14 is a valid byte. Based on these control signals the logic circuit 47 provides a binary number on lines 53, 55, indicating how many bits of a current byte on line 14 are valid bits. The output from circuit 47 is in the form of a 4-bit digit, of which lines 55 apply the three LSB's and the MSB is on line 53. The MSB on line 53 is applied to a first input of an OR-gate 62. The LSB portion on lines 55 is applied to an adder 63, which in the preferred embodiment is a three bit adder with a summation output on line 61, representing the LSB's of the sum, and a carry output on line 57, representing the MSB of the sum. The adder adds the least significant bits applied on lines 55 to the least significant bits of the previous sum, and if the resulting sum is equal to or greater than 8, it applies a carry output on line 57 to a second input of OR-gate 62. Either carry bit (MSB) on line 53 or 57 is applied via the OR-gate 62 to a flip-flop 65, which reclocks it and the reclocked signal is applied as the previously described control signal on line 66 to the AND-gates 54, 58 and 59 in the parallel data path.

The LSB portion of the sum provided by the adder 63 is applied via line 61 to flip-flop 64, where it is reclocked, and fed back via line 68 to a second input of adder 63, whereby that sum is effectively stored therein. Thus the LSB input on line 55 is added to that previously stored sum, and when the new sum is equal to eight or more, the MSB of that sum is applied as a carry bit on line 57 to OR-gate 62, and the LSB's of the sum are fed back on line 68 as previously described. The output signal from flip-flop 64 is also applied to the bit shifter 30 as the control signal on line 42, indicating the number of bit positions by which the next data byte on line 24 is to be shifted. The signal delays in the parallel data path are matched with the delays provided by the control circuit 44 in the control signal path, so that the control signals on lines 42 and 66 occur simultaneously with the data on lines 70. Therefore, no additional data buffers or delay lines are needed to obtain synchronous operation.

It will be understood from the above description that when n<m, the MSB signal on line 53 will always be low and gate 62 may be deleted.

An example of the operation of the data packer of FIG. 1 is given below. In this example, as it has been previously indicated, the pack ratio is n=11 and it does not vary during the operation, and the fixed width of the parallel output data word is m=8 bits. Prior to operation, all flip-flops 40, 48, 65, 64 shown -bit in FIG. 1 are set to 0. At start-up, when the first 11-bit parallel input data word is received on lines 10, the multiplexer 12 first applies the LO byte parallel word recived at its input A, which has 8 valid bits. It will be referred to that byte as the first byte of the parallel input word. Simultaneously, the control signal on line 16 is high indicating that the first byte is present on line 14. The control signal on line 22 is high, indicating that the first input word is valid, and the control signal on line 20 carries a binary number indicating the pack ratio n=11. The logic circuit 47 receives the control signals on lines 16, 20 and 22, and outputs on lines 53, 55 a binary number corresponding to the number of valid bits of the byte on line 14, which in this case is equal to 8. Consequently the logic circuit 18 applies the 8 valid bits of the first byte via line 24, bit shifter 30, and OR-gate 36 to the inputs of output register 40. Because the number of valid bits in register 40 is now equal to the predetermined number m=8, these bits are ready to be output therefrom as a packed output word on lines 70 at the next clock on line 32. Because the present signal on lines 53, 55 is a binary representation of 8, the MSB carry output on line 53 is high and is applied via OR-gate 62 and flip-flop 65 as the previously described control signal on line 66, which signal in turn enables AND-gates 54, 58 and 59 in the parallel data path. Clocking of the high level signal on line 53 into flip-flop 65 takes place simultaneously with clocking the 8 valid bits of data on line 45 into input register 40. At the same time the LSB summation output signal on line 61 has a zero value, and consequently the control signal on line 42 is low, indicating zero shift in the bit shifter 30 for the second incoming data byte on line 14.

The next data byte applied on line 14 is the second (MSB) byte of the parallel input word and it has 3 valid bits. The control signal on line 16 is now low, indicating presence of the second byte on line 14. The control signals on lines 20, 22 remain unchanged. Now the binary number on lines 53, 55 indicates 3 valid bits, that is the binary number on lines 55 is equal to 3, and on line 53 is equal to zero. Consequently the logic circuit 18 sets the remaining 5 bits of the present byte to zero, and applies the resulting output signal via line 24 to the bit shifter 30. Because line 42 indicated zero shift, that second byte is applied by the bit shifter without shifting via lines 34 and OR-gate 36 to the LSB input locations of output register 40. At the same time, the value 3 on lines 55 is input into the adder 63, and added to the previous contents of the adder, which is zero. The resulting sum equal to 3 is output on line 42 to the bit shifter 30. Accordingly the bit shifter will shift the next received byte, which is the first byte of the second parallel input word by three bit positions in the direction of the MSB's. The previously received data bits are stored in the output register 40 by clocking from its output to its input via line 50, and gates 54, 36 as described previously.

The next data byte on line 24 is the first (LSB) byte of the next 11-bit input data word, which has 8 valid bits. However now that first byte is shifted by the bit shifter 30 by 3 bit positions towards the MSB positions. Therefore, the first 3 LSB's on the 8 parallel lines 34 will be non-valid zero bits, and the remaining five bits will be valid bits. The resulting byte on line 34 is applied via gate 36 to the inputs of the output register 40, where these five valid bits will be stored at the remaining MSB locations in the received order. Simultaneously in the control signal path the signal on lines 53, 55 indicates 8 valid bits. Thus the MSB on line 53 is high and it is applied via gate 62 and flip-flop 65 as the control signal 66, which in turn disables AND-gate 54 from further feedback, and indicates that the packed data from the output register 40 is ready to be taken from lines 70. The LSB signal on lines 55 is zero, and therefore the amount of bit shift on line 42, which has been equal to 3, remains unchanged. Thus the next data byte received by the bit shifter 30 will be shifted by 3 bit positions.

Simultaneously with transferring the LSB byte on lines 34 from the bit shifter 30, the remaining 3 valid bits of the previously shifted first byte of the second input word are transferred therefrom via lines 46 and OR-gate 60 to the intermediate register 48. These bits are stored in register 48 by clocking from its output to its input via line 52, AND-gate 58 and OR-gate 60. At the occurrence of the previously described control signal on line 66, the data stored in the intermediate register 48 is transferred via AND-gate 59 and OR-gate 36 to corresponding bit locations of the output register 40, from which the previously stored packed data word has been transferred on line 70.

The next data byte on line 24 is the second byte of the second parallel input data word, and it has 3 valid bits. That is, the output signal on lines 53, 55 from logic circuit 47 is equal to 3. The three bits of the second byte of the second word are shifted by 3 and stored in output register 40 simultaneously with transferring the three bits stored in intermediate register 48 to register 40. The value 3 is added to the previously stored value 3 in adder 63, and the resulting summation output on line 42 is now equal to 6. Therefore, the present data byte on line 24, that is the first byte of the third input word, is shifted by the bit shifter 30 by 6 bit positions in the direction of the MSB. Consequently, the first 6 LSB's on line 34 will be non-valid zero bits, and the last two bits will be valid bits. That byte is applied via OR-gate 36 to the inputs of output register 40, where the two previously shifted valid bits are stored at MSB locations next to the previously stored 6 valid LSB's. The resulting byte in the output register has 8 valid bits and thus correspond to the packed output data word. At the same time the signal on line 66 disables gates 54 and 58 to prevent further feedback of previously stored data, and enables transfer of data from intermediate register 48 via gate 59 to corresponding bit locations of output register 40, and thus, the carry signal on line 66 indicates that a packed word on line 70 is ready to be output.

Simultaneously with the transfer of the data byte on line 34, the remaining 6 valid bits of the shifted byte are transferred via line 46 and gate 60 to the inputs of intermediate register 48. In response to the above-described control signal on line 66 these 6 valid bits are transferred from the output of intermediate register 48 via gates 59, 36 to the LSB locations in the output register 40. Because the shift amount on line 42 is now equal to 6, the next data byte on line 24, that is the second byte of input word 3, will be shifted by 6 bit positions in the bit shifter 30, and two valid bits of the thusly shifted byte will be transferred to the MSB input locations of output register 40. Simultaneously the remaining 1 valid bit will be transferred to the intermediate register 48, and the operation will continue as above described. It is seen from the foregoing description that the input data flow is uninterrupted and the packed data word is applied from the output register immediately after there are 8 valid bits stored therein.

Figure 3:
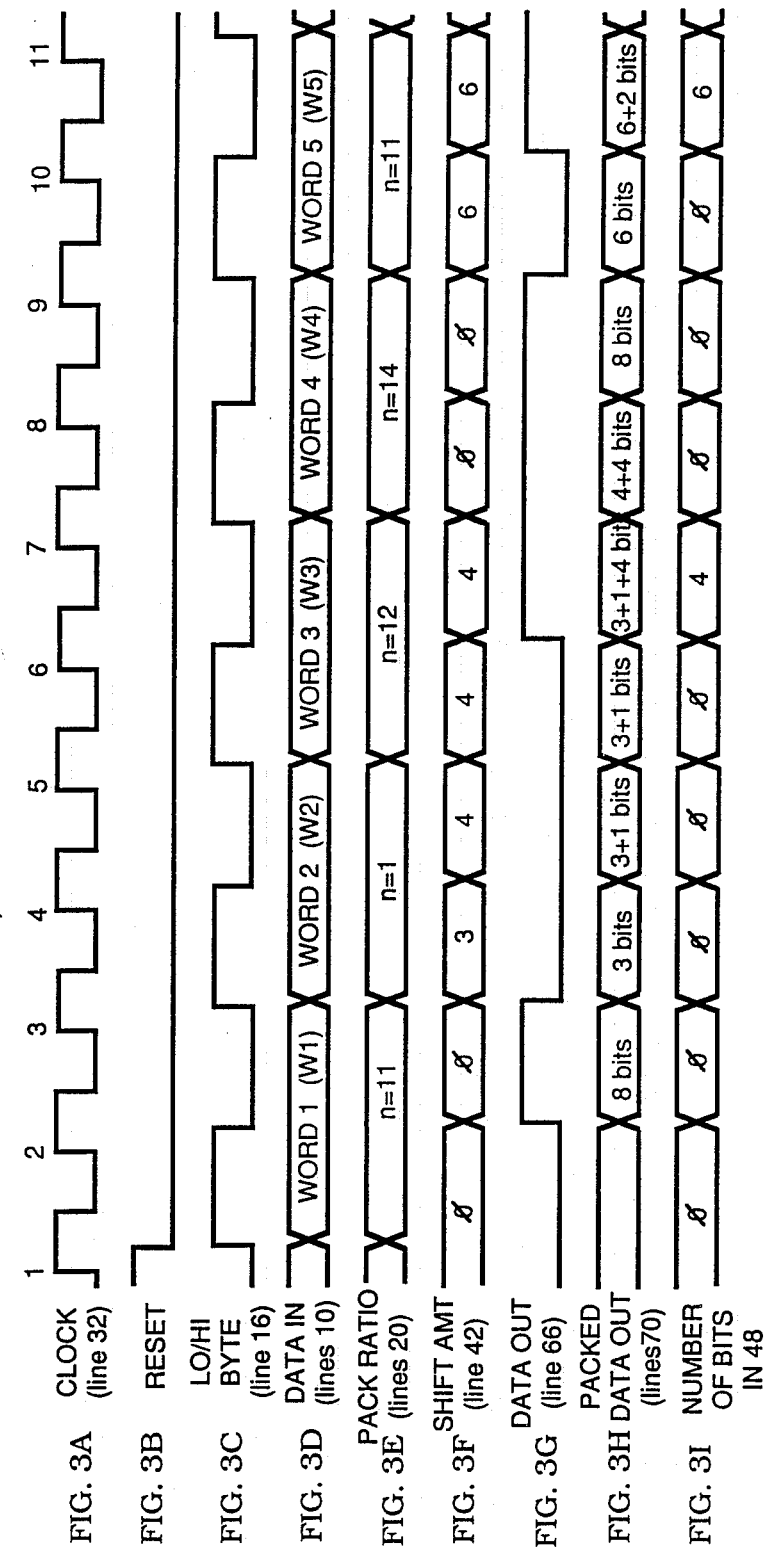
FIGS. 3A-3I are a timing diagram representing an example of the data flow and various control signals with reference to the circuit of FIG. 1.

To provide a more complete disclosure, the operation of the data packer of FIG. 1 will now be described as an example, where the pack ratio n varies during the operation from one parallel input data word to the next. In this example reference will be made to the timing diagram of FIG. 3, showing the data flow and various control signals occurring in the circuit of FIG. 1. Thus in FIG. 3 there is shown at (A) the internal clock signal on line 32; at (B) a reset signal (not shown in FIG. 1 for simplicity) which is utilized to reset all the flip-flops 40, 48, 64 and 65 to zero, in a well known manner, as it is necessary for example for circuit initialization; at (C) the LO/HI byte control signal on line 16; at (D) the 16-bit parallel input data words on lines 10; at (E) the varying pack ratio n on line 20 for each input data word; at (F) the bit shift amount on line 42; at (G) the data out control signal on line 66; at (H) the packed output data words on lines 70; and at (I) the number of valid bits stored in the intermediate register 48.

With further reference to FIG. 3, the circuit is initialized by applying a reset signal (B) until shortly after the rising edge of the first clock cycle (A). The reset signal sets all the registers utilized in the circuit of FIG. 1 to zero in a well known manner. The first 16-bit parallel input data word (W1) shown at (D) has its first (LO) byte occurring on line 14 coinciding with the high state of the LO/HI byte control signal (C) on line 16, and its second (HI) byte coinciding with the low state of that control signal. The pack ratio on line 20 (E) for the first data word (W1) is n=11, that is the first byte has 8 valid bits and the second byte has 3 valid bits. The amount of shift on line 42 (F) for the first and second byte of W1 is zero. At the rising edge of the second clock pulse (A) the 8 valid bits of first byte of W1 are latched in output register 40. Also at the rising edge of the second clock pulse, line 66 (G) goes high, indicating that lines 70 now contain a full packed data byte. At the rising edge of the third clock pulse (A) the 3 valid bits of the second byte of W1 are latched in register 40 without shifting and they are stored therein. During the third clock cycle the control signal on line 42 (F) indicates shifting by 3 bit positions. The control signal on line 66 is low (G), and therefore data is not being output from register 40.

The second parallel input data word (W2 shown at D) has a pack ratio n=1 (E). Thus the first byte has 1 valid bit and it is shifted by the bit shifter by 3 bit positions, and latched into the register 40 at the rising edge of the fourth clock pulse. Thus during the fourth clock cycle there are 4 valid bits stored in output register 40 (H). The shift amount on line 42 changes to 4 bit positions (F). The control signal on line 66 is low indicating that a full byte of packed data is not yet ready on lines 70. The second byte of W2 has zero valid bits and therefore the bit contents in output register 40 remains unchanged (H) during the fifth clock cycle.

The third input word (W3) has 12 valid bits, that is its first byte has 8, and its second byte has 4 valid bits. The first byte is shifted by 4 bit positions and thus only four valid bits of the shifted first byte are latched into the output register 40 at the rising edge of the sixth clock cycle. The remaining 4 bits are latched simultaneously in the intermediate register 48 (I). There are now 8 valid bits in register 40 and the control signal on line 66 goes high (G) indicating that a packed data byte is ready on lines 70. At the rising edge of the seventh clock pulse the four valid bits are transferred from the intermediate register 48 to the corresponding bit locations of the output register 40. Also at the rising edge of the seventh clock pulse the four valid bits of the second byte are shifted by 4 bit positions, and applied to register 40. Line 66 (G) remains high indicating the presence of another full packed data byte on lines 70. The amount of bit shift on line 42 is now zero (F), and the intermediate register (48) does not contain any valid bits (I).

The fourth input word (W4) has 14 valid bits, that is its first byte has 8, and its second byte has 6 valid bits. At the rising edge of the eighth clock pulse the first byte is latched in output register 40 without shifting (F), because the shift amount on line 42 is zero. Line 66 (G) stays high, indicating that the first byte of W4 constitues a valid packed data byte. The six valid bits of the second byte of W4 are latched in register 40 without shifting (F) at the rising edge of the ninth clock pulse, but they remain stored therein because the control signal on line 66 is low (G). The intermediate register 48 still does not contain any valid bits (I) and the bit shift amount on line 42 changes to 6 (F).

The fifth input word (W5) has 11 valid bits, therefore its first byte has 8, and its second byte has 3 valid bits. The amount of shift on line 42 is now 6, therefore the first byte of W5 is shifted by 6 bit positions and thus only 2 bits thereof are clocked in the output register 40 (H) at the rising edge of the tenth clock pulse, at which time the control signal on line 66 becomes high. At the rising edge of the eleventh clock pulse the eight valid bits present in register 40 are output therefrom and the remaining 6 shifted valid bits of the first byte are transferred from bit shifter 30 to the intermediate register 48 (I). The three valid bits of the second byte of W5 are shifted by 6 bit positions (F) by bit shifter 30, and at the rising edge of the eleventh clock pulse 2 of the shifted bits are transferred to the output register 40 (H), while the remaining 1 bit is transferred to the intermediate register 48 (I). The amount of shift on line 42 changes to 1. The total number of bits in register 40 is now 8, and line 66 remains high indicating that another packed data byte is ready.

It will be understood from the above description that when n is less than or equal to m, that is the width of the parallel input word on lines 10 is between 1 and 8 bits, the control signal on line 16 may be maintained at high level during the entire operation. Consequently, the multiplexer 12 may be deleted from FIG. 1, and the parallel data flow applied to lines 10 will be at twice the previously described rate. When, in addition, the data valid signal on line 22 is maintained at high level or it is not used, the logic circuit 47 may also be deleted, in which case lines 53, 55 would be connected directly to lines 20.

It will follow from the foregoing description of the circuit of FIG. 1 that in some special cases when, for example, the pack ratio n is equal to 1, 2, 4, 8 or 16, the intermediate register 48 may not be needed for data storage because the shifted data may be applied directly to the output register 40.

Figure 2:
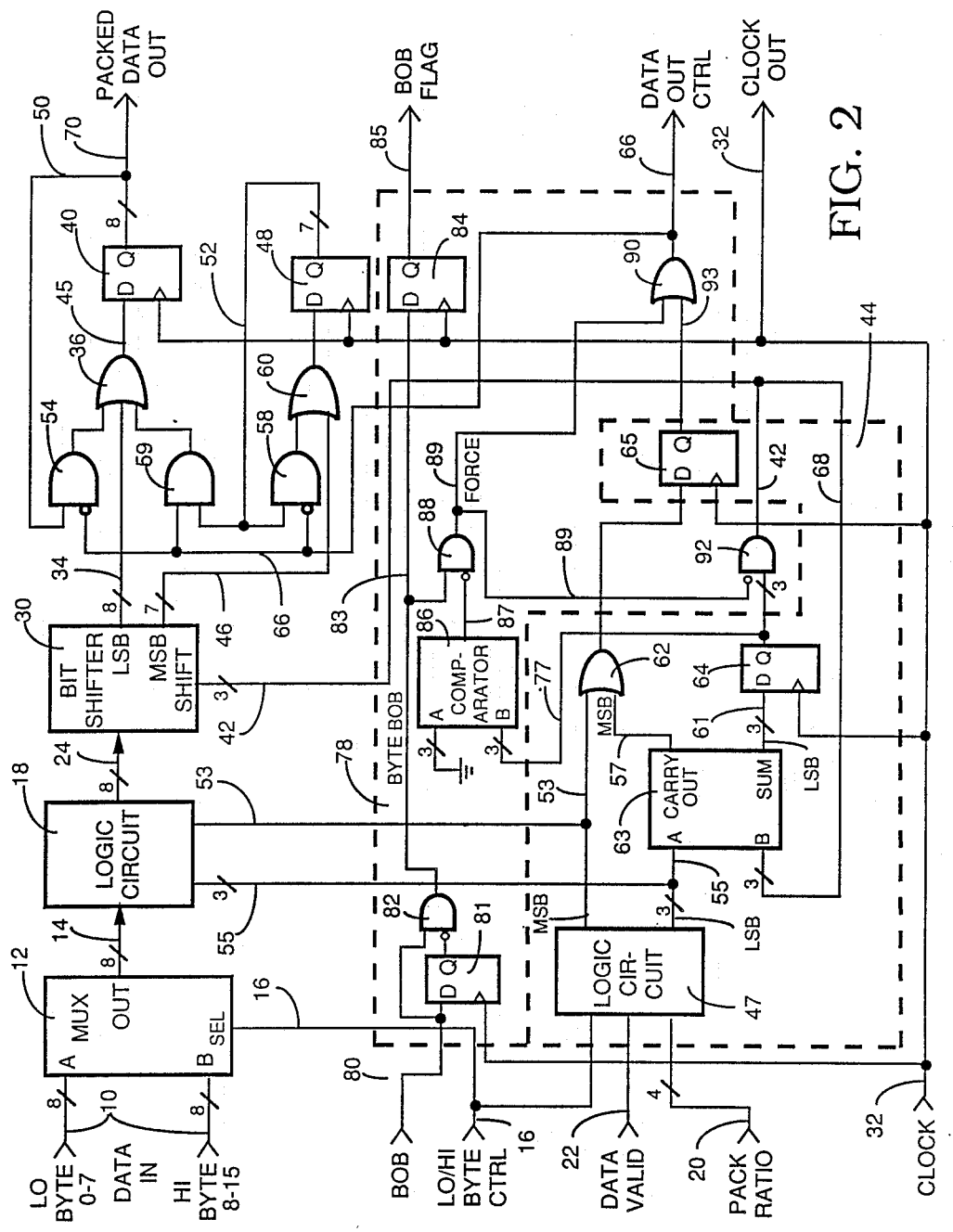
FIG. 2 is a block diagram of the preferred embodiment of the data packer of the invention.

The preferred embodiment of the data packer is shown in FIG. 2 and it is described below. In this embodiment data is received in the form of data blocks. The beginning of each new block of data is designated by a beginning of block (BOB) control signal received on line 80. FIG. 2 comprises all the circuit elements previously described and shown in FIG. 1, and in addition it comprises a circuit portion 78 which is utilized to prevent packing of data bits from two different consecutive data blocks into the same packed output data word. In the preferred embodiment the BOB signal is coexistent with the reception of the first word of a new data block on lines 10. The length of a data block is usually given by a particular application, and may be selected, for example a thousand words, that is one kiloword. For example, in the above-described embodiment, where each input word has 11 valid bits, the above-indicated data block would have 11 bits×1000=11 kilobits. Circuit 78 detects the beginning of a data block and assures that the last data bits from a previous block are output on line 70 as a separate packed word, followed by a next packed output word which contains data only from a new block. Wrapping of packed data bits from a previous block over the beginning of a new data block is thereby prevented, and each new block of data starts with a new packed data word.

When the circuit 78 detects a new block of data, it sets the control signal on line 42 to zero, thereby preventing shifting of data bits pertaining to the first byte of a first word of the new block. At the same time circuit 78 sets the control signal on line 66 high, thereby forcing output of data bits pertaining to a previous block, which are present in the output register 40, regardless whether all bit positions therein have been filled with valid data.

In operation, a beginning of block (BOB) control signal is received on line 80 simultaneously with receiving the first input word of each new data block on lines 10. The BOB signal is applied to a flip-flop 81 and one input of an AND-gate 82, whose other, inverting input is connected to the output of flip-flop 81. The BOB signal on line 80 is clocked through flip-flop 81 and AND-gate 82 as a one byte long pulse on line 83. The signal on line 83 is clocked through a flip-flop 84 and is output on line 85 as a BOB flag for further use.

A comparator 86 compares the previously described summation output signal level on line 61 from adder 63 to zero signal level, and when comparison is obtained, the comparator provides a high output signal on line 87. The signal on line 83 and the inverted signal on line 87 are both applied to an AND-gate 88, which in this case outputs a low output signal on line 89. The signal on line 89, also referred to as force signal, and the output signal on line 93 from flip-flop 65, which corresponds to the previously described MSB signal, are both applied via an OR-gate 90 as the previously described data out control signal on line 66. Thus when both signals on lines 89, 93 are low, the control signal on line 66 is low, and it prevents the data in the output register 40 from being output via line 70.

When the summation output on line 61 from adder 63 has a value other than zero, the output on line 87 from comparator 86 is low, in turn enabling AND-gate 88, which outputs a high force signal on line 89. That signal is gated through OR-gate 90 and thus forces the control signal on line 66 to go high, which in turn enables output of the data stored in the output register 40. That stored data belongs to the previous data block, and it is output regardless of the status of the signal on line 93. It is seen from the foregoing description that when the beginning of a new block of data is detected by circuit 78, and there are valid bits from the previous block stored in register 40, the force signal on line 89 forces output of the data from the output register 40 even when not all the bits stored therein are valid bits.

Simultaneously the highlevel signal on line 89 disables AND-gate 92, in turn forcing the output thereof on line 42 to go low, regardless of the signal value at the other input of AND-gate 92, which corresponds to the previously described summation LSB output signal from the adder 63. Thus the signal on control line 42 is forced to have a zero value, thereby setting the bit shift value to zero. Thus the bit shifter 30 will not shift the first data byte of the first word of a new data block.

Figure 4:
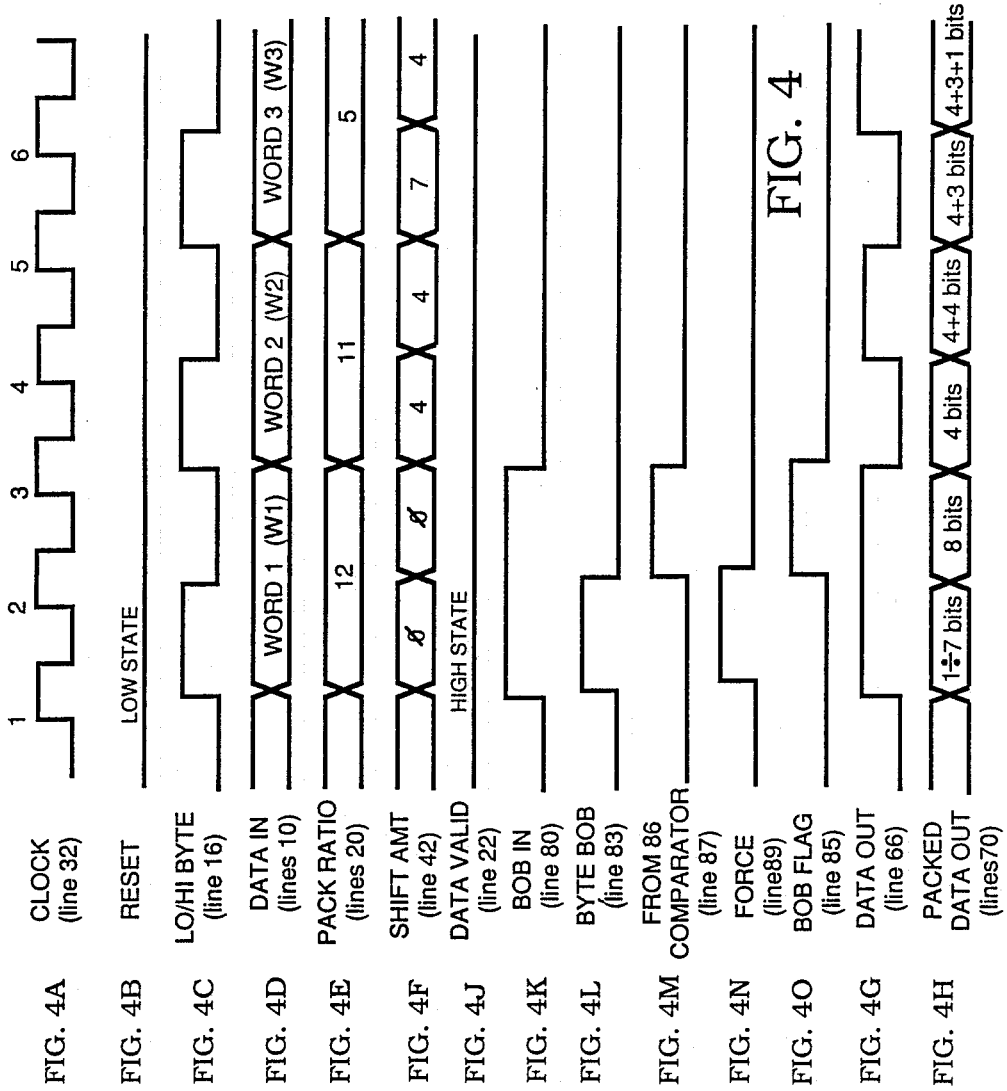
FIGS. 4A-4H are a timing diagram representing an example of the data flow and various control signals with reference to the circuit of FIG. 2.

Now the operation of the circuit of FIG. 2 will be described with reference to the timing diagram of FIG. 4. The signals shown in FIG. 4 at (A) to (H) correspond to those previously described and shown in FIG. 3. With further reference to FIG. 4, the rising edge of a beginning of block (BOB) control signal received on line 80, shown at (K), indicates the beginning of a new block of parallel input words received on lines 10 (D), and it is coexistent with the first word (W1) of that the new block. The BOB signal on line 80 (K) is clocked through the flip-flop 81 and applied via AND-gate 82 as a byte BOB pulse on line 83 (L) having the same duration and coexistent with the first byte of the input word on lines 10 (D). The signal on line 83 is reclocked by flip-flop 84 and applied as the BOB flag on line 85 (O), as a pulse coexistent with the first byte of the parallel output data word on line 70 (H), pertaining to the new block of data.

In the example of FIG. 4, and with further reference to FIG. 2, the summation signal on line 77 applied to comparator 86 has a non-zero value, indicating presence of 1 to 7 valid bits of data in output register 40 (H). Consequently, the output signal on line 87 from comparator 86 (M), has a low value, in turn enabling AND-gate 88. The resulting high force signal on line 89 (N) from gate 88 is applied via OR-gate 90 as the previously described control signal on line 66 (G), which in turn forces output of the 1 to 7 bits contained in output register 40, before it would receive any additional bits from the next input word which pertains to the new block. At the same time the high signal on line 89 (N) disables the AND-gate 92, thereby setting the amount of bit shift on line 42 (F) to zero. Consequently, the first byte of the input word pertaining to the new block will not be shifted by the bit shifter 30, and will be applied to the LSB locations in the output register 40.

Figure 5:
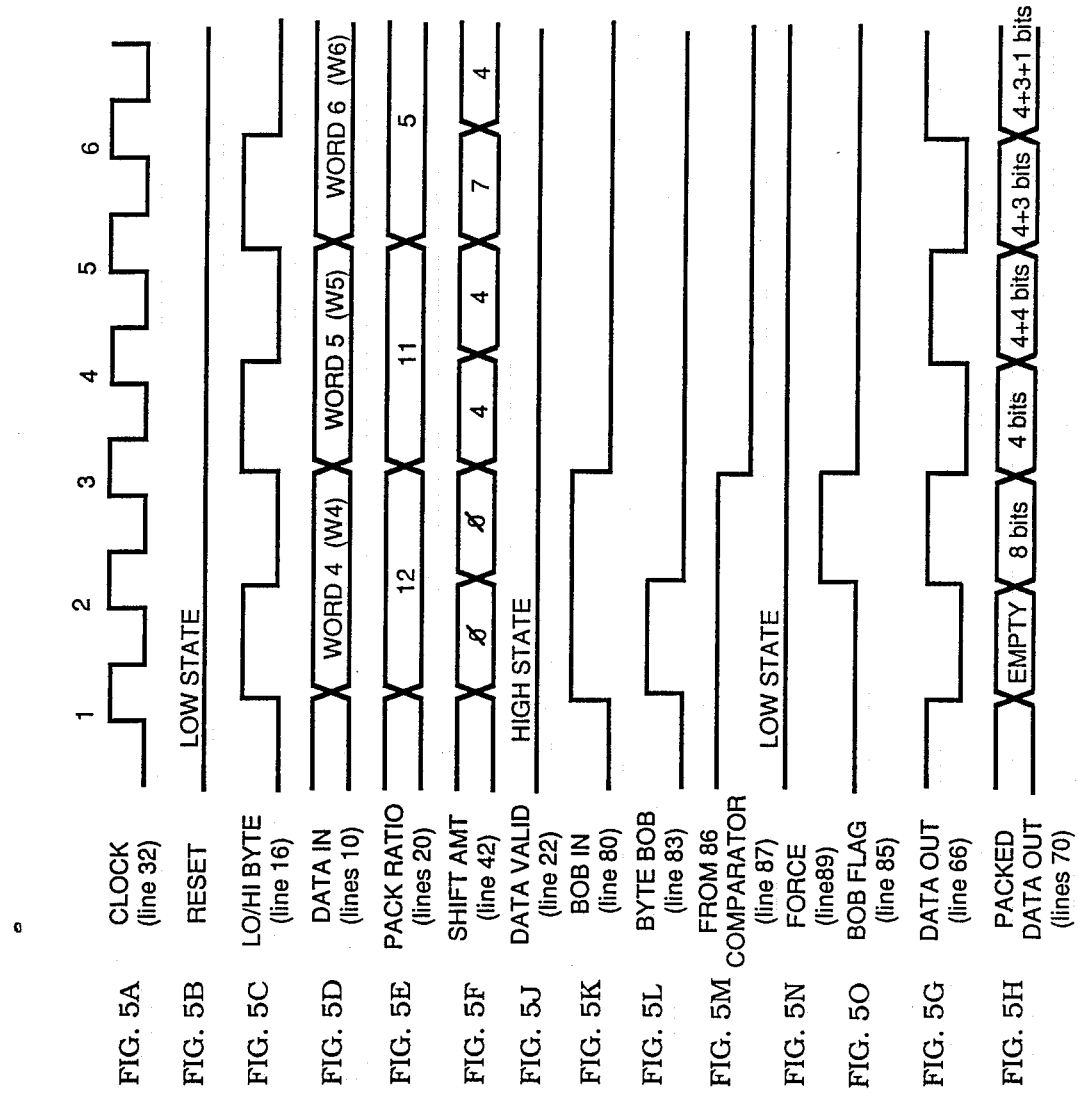
FIGS. 5A-5H are a timing diagram representing another example of the data flow and various control signals with reference to the circuit of FIG. 2.

A different example of operation of the circuit of FIG. 2 is described below with reference to the timing diagram of FIG. 5. In this example when the BOB signal on line 80 (K) is received, the output from comparator 86 on line 87 is high, indicating presence of zero valid bits in output register 40 (H). Consequently, the high signal on line 87 disables AND-gate 88, and the force signal on line 89 (N) is low. Therefore the output signal from OR-gate 90 on line 66 is not influenced by the presence of a high force signal on line 89, as it was in the previously described example shown in FIG. 4. In the present case the signal on line 66 (G) stays low until the signal on line 93 changes to high, when the first byte of the output word pertaining to the new block of data is output from register 40 (H). It follows from the foregoing description that the control signal on line 66 is forced to go high only when there are valid bits from a previous data block stored in the output register 40 at the time when input data from a new block is received by the data packer.

Figure 6:
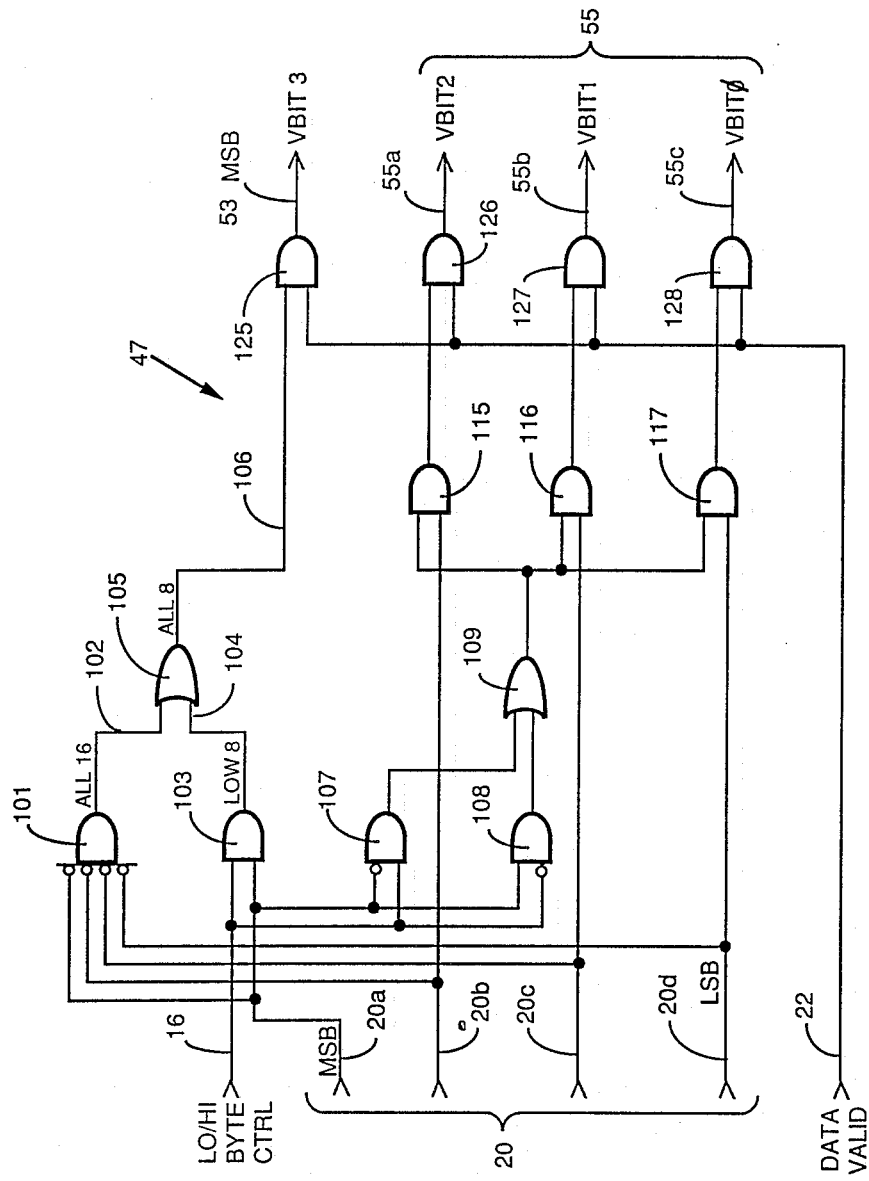
FIG. 6 is a detailed diagram depicting an example of the logic circuit 47 of FIGS. 1 and 2.
Figure 7:
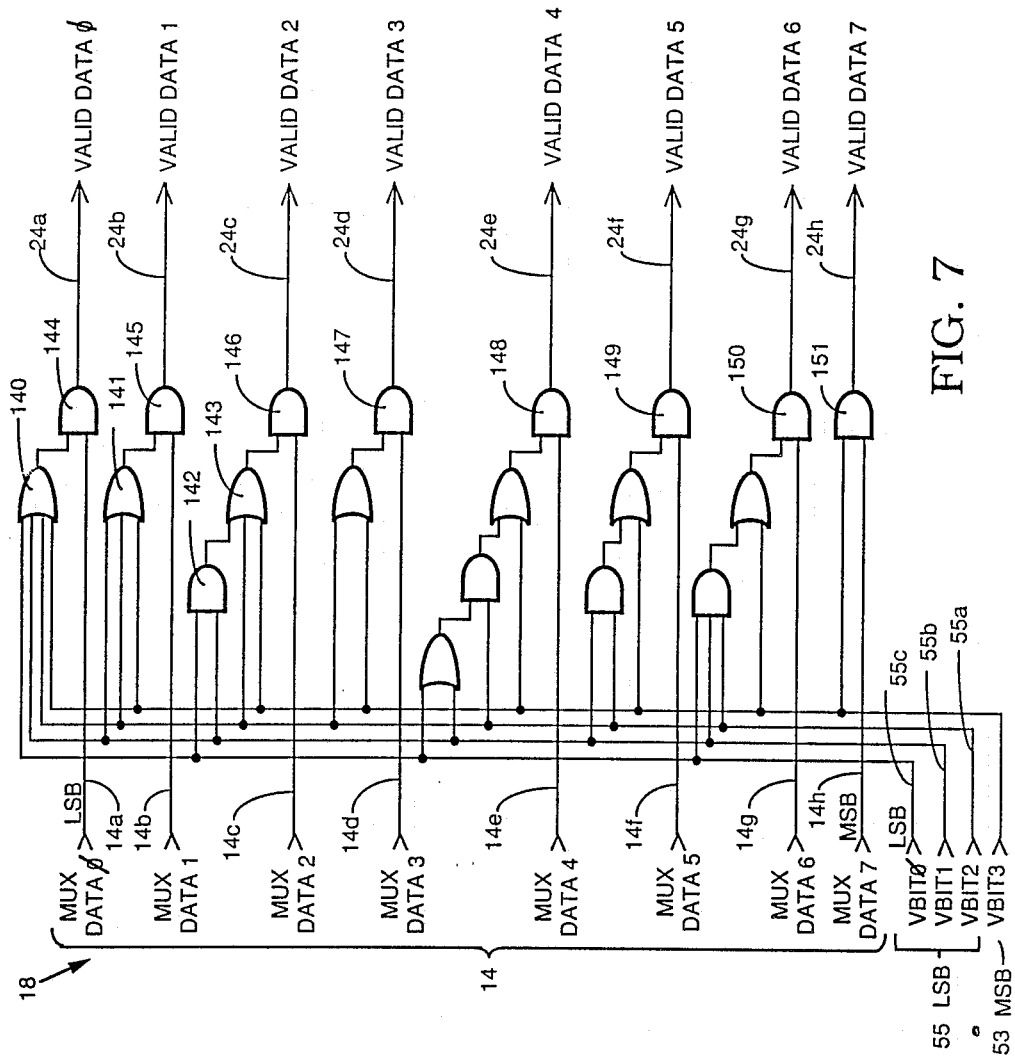
FIG. 7 is a detailed diagram depicting the logic circuit 18 of FIGS. 1 and 2.

To provide a more detailed description of the herein described embodiments, FIG. 6 shows an example of the implementation of the logic circuit 47, and FIG. 7 shows an example of the logic circuit 18 utilized in the data packer of FIGS. 1 and 2.

The logic circuit 47 shown in FIG. 6, receives the LO/HI byte control signal on line 16, the pack ratio on four parallel lines 20a to 20d, and the data valid control signal on line 22. As it has been previously described, based on these input signals the logic circuit 47 provides an output signal on lines 53, 55, indicating the number of valid bits in a current input data byte on line 14. The four parallel lines 20a to 20d carry a binary representation of the pack ratio n, which in the presently described embodiment may vary from 1 to 16. In order to represent the range of binary values from 1 to 16 while utilizing only 4 lines, in this example the number 16 is represented by 0000, that is low signal values on all 4 lines. The binary number on lines 20a to 20d is applied to inverting inputs of an AND-gate 101, and when all 4 lines are low, the signal on line 102 is high, indicating n=16. The MSB of the pack ration on line 20a is applied to AND-gates 103 and 108, and to an inverting input of an AND-gate 107. The second input of each AND-gate 103 and 107, and an inverting input of AND-gate 108 are connected to the LO/HI control signal on line 16. The output signal on line 104 from AND-gate 103 is applied together with the signal on line 102 via OR-gate 105 to line 106. The output signals from AND-gates 107 and 108 are applied via OR-gate 109 to respective first inputs of AND-gates 115 to 117. The respective second inputs of these AND-gates are each connected to one of the LSB lines 20b to 20d.

In operation, when the data valid signal on line 22 is high and when for example n=16, AND-gate 101 is enabled and the signal on line 102 is high, thereby providing a high signal via OR-gate 105 and AND-gate 125 on MSB output line 53 during both the high and low state of the control signal on line 16. Because in this example the signal on all the lines 20a to 20d is low, the AND-gates 103 and 115 to 117 are disabled, and the LSB output signal on lines 55a to 55c is low, representing a binary value of 0.

For example when the pack ratio n=3, the signal on lines 20a and 20b is low, and on lines 20c and 20d is high. Consequently AND-gates 101, 103 and 115 are disabled, regardless of low or high signal level on line 16, in turn providing a low output signal on lines 53 and 55a. However the combination of high level on lines 20c, 20d, with the high level on line 16 via gates 107 and 109 during each LO byte, enables AND-gates 116, 117, and also AND-gates 127, 128, provided that the data valid control signal on line 22 is high. As a result, the LSB output lines 55b and 55c will be high, representing a binary value of 3 while the signal on line 16 is high, that is, while the first byte of the 3-bit word is on lines 14. While line 16 is low, during the second byte of the 3-bit word, all lines 53, 55a to 55c carry zero signal values, indicating 0 valid bits on lines 14.

In another example, when n=11, the lines 20a, 20c and 20d are high. The high signals on lines 20a, 20c and 20d disable gate 101. During a high state of the control signal on line 16, that is during the first byte of the input word, gate 103 is enabled. Thus the MSB line 53 will be high, provided the data valid control signal on line 22 is high. At the same time because of the low signal on line 20b, gate 115 is disabled, while the high signal on line 16 disables gate 108, and the high signal on line 20a disables gate 107. Thus the AND-gates 115 to 117 are disabled via OR-gate 109 during the first byte of the input word, and lines 53, 55a to 55c provide a binary representation of 8, indicating that lines 14 contain 8 valid bits. On the other hand, during the second byte, when the signal on line 16 is low, gates 103 and 107 are disabled, but gate 108 is enabled, in turn enabling gates 116, 117. Gate 115 stays disabled due to low signal on line 20b. As a result, the output lines 53, 55a are low, while lines 55b, 55c are high, thus providing a binary representation of 3.

FIG. 7 is an example of a detailed circuit diagram of the logic circuit 18 utilized in FIGS. 1 and 2. Circuit 18 receives data bits on 8 parallel lines 14a to 14h from the multiplexer 12 shown on FIGS. 1 and 2. It also receives on control lines 53 and 55a to 55c the binary number indicating the number of valid data bits in each input data byte on line 14, as it has been described above with reference to FIG. 6. The logic circuit 18 sets to zero all the non-valid bits of each input data byte to prevent non-valid bits from being clocked into registers 40 or 48, where they may obscure valid data from subsequently stored data words.

As it is seen from FIG. 7, each parallel input line 14a to 14h is connected to one input of a respective AND-gate 144 to 151. A second input of each AND-gate is connected to one or more control lines 53, 55a, 55b and 55c via respective logic gates. These logic gates enable the input signal on each input line 14a to 14f to pass through each particular AND-gate 144 to 151 only when the binary number on the control lines indicates that the particular bit position assigned to that input line holds valid data.

Thus, for example when the binary number on lines 53, 55a to 55c is equal to 3, lines 55c 55b will be high, and lines 55a, 53 will be low. Thus AND-gates 147 to 151 will be disabled, thereby rendering the respective signals on corresponding output lines 24d to 24h to zero. However, AND-gate 144 is enabled via lines 55c, 55b and OR-gate 140; AND-gate 145 is enabled via line 55b and OR-gate 141; and AND-gate 146 is enabled via lines 55a, 55b, AND-gate 142 and OR-gate 143. Consequently the resulting output-signal on lines 24a to 24c will be equal to the signal on lines 14a to 14c, while the signal on the rest of the output lines 24d to 24h carrying non-valid data bits will be at a low level, indicating zero value.

The bit shifter 30 in the preferred embodiment may be implemented in a well known manner as three consecutive logic gate stages. The first stage receives the LSB of the signal on three parallel lines 42, which indicates shift by one bit. The second stage receives the next higher bit of the signal on line 42, indicating shift by two, and the last stage receives the MSB, indicating shift by four. Thus the bit shifter may shift the parallel input data applied thereto simultaneously by any number of bit positions between 0 and 7. As the bit shifter 30, for example a 32-bit barrel shifter, type SN54AS8838 or SN74AS8838, manufactured by Texas Instruments Corporation may be utilized. However, a data packer in accordance with the present invention has been built utilizing a programmable Logic Cell Array, type 3020, manufactured by XILINX Corporation.

It is understood that although certain preferred embodiments of the present invention have been illustrated and described, various modifications, alternatives and equivalents thereof will become apparent to those skilled in the art, without departing from the scope of the invention as set forth in the appended claims.

What is claimed is:

1. An apparatus for packing data, receiving parallel data words having a width equal to a variable number of n valid data bits, and providing parallel output data words having a width equal to a fixed number of m valid data bits, comprising:
    a control circuit for receiving a signal corresponding to a binary representation of said number n for each received data word, said signal having a most significant bit (MSB) portion when n is equal to or greater than m, and a least significant bit (LSB) portion, corresponding to least significant bits of said number n, said MSB portion being applied by said control circuit as a first MSB control signal, said control circuit comprising an adder means;
    said adder means receiving and summing subsequently received LSB portions of said signal to provide a running sum, and for providing a second MSB control signal corresponding to an MSB portion of said running sum when said running sum is equal to or greater than m, said adder means further providing a third control signal corresponding to an LSB portion of said running sum;
    bit shifter means for receiving said third control signal, receiving and shifting said parallel data words by a number of bit positions corresponding to said third control signal; and
    data output means for receiving and storing data bits from said bit shifter means in a received order, and for providing an m-bit wide packed parallel output word at an occurrence of one of said first and second MSB control signal.

2. The apparatus of claim 1, wherein said data output means comprises:
    output register means for receiving and storing m valid output data bits;
    intermediate register means for receiving and storing a number of valid data bits from said bit shifter means which are in excess of m valid data bits received and stored by said output register means; and
    output data logic means for enabling transfer of said valid data bits from said intermediate register means to corresponding bit locations of said output register means in response to one of said first and second MSB control signal.

3. The apparatus of claim 1 further comprising a first logic means for receiving said parallel data words, said first MSB control signal and said LSB portion of said signal from said control circuit, and for setting respective non-valid bits of each parallel data word to zero, prior to applying said parallel data words to said bit shifter means.

4. The apparatus of claim 1 wherein said received parallel data words are arranged in blocks of data, and wherein said data packer further comprises a second logic means for receiving a BOB control signal indicating receipt by said data packer of a first parallel word pertaining to a new block of data, said second logic means in response to said BOB control signal applying a force control signal to said data output means to provide an m-bit wide packed parallel output word containing valid data bits pertaining to a preceding block of data, and setting said third control signal to zero.

5. The apparatus of claim 4 wherein said second logic means comprises a comparator means having a first input coupled to a low level logic signal indicating a zero value, and a second input coupled to receive said LSB control signal from said adder means, said comparator means providing an output signal for disabling said force signal when said third control signal has a zero value indicating that no valid data bits are present in said output means.

6. The apparatus of claim 1 wherein said received parallel data words are arranged in blocks of data, each block comprising a number of data words, said apparatus further receiving a beginning of block control signal which is coexistent with receiving a first parallel data word pertaining to a new block of data, further comprising:
    comparator means having a first input for receiving a signal corresponding to a zero logic value, a second input for receiving said third control signal, and providing an output signal having a first logic level when comparison is obtained, and a second logic level signal when comparison is not obtained; and
    logic means for applying to said data output means a fourth control signal in response to said second logic level signal and said beginning of block control signal, said data output means providing at an occurrence of said fourth control signal an m-bit wide packed output word containing valid data bits pertaining to a preceding block of data, and said logic means setting said third control signal to zero.

7. An apparatus for packing data, receiving parallel data words having a width equal to a variable number of n valid data bits, and providing parallel output data words having a width equal to a fixed number of m valid data bits, comprising:
    first logic means receiving a signal indicating a number of valid bits in each received data word, for providing a first control signal corresponding to a most significant bit when said number of valid bits is equal to or greater than m, and an output signal corresponding to least significant bits of said number of valid bits;
    adder means for receiving and summing respective subsequent output signals of said first logic means to obtain a running sum, and for providing a second control signal corresponding to a most significant bit of said running sum when said running sum is equal to or greater than m, said adder means further providing a third control signal corresponding to least significant bits of said running sum;
    bit shifter means for receiving and shifting said parallel data words by a number of bit positions indicated by said third control signal; and
    data output means for receiving and storing valid data bits from said bit shifter means in a received order and for providing a packed parallel output word having m valid data bits at an occurrence of one of said first and second control signal.

8. An apparatus for packing data, receiving parallel data words having a width equal to a variable number of n valid data bits, and providing parallel output data words having a width equal to a fixed number of m valid data bits, comprising:
- a control circuit for receiving a signal corresponding to a binary representation of said number n for each subsequently received data word, said signal having a most significant bit (MSB) portion when n is equal to or greater than m, and a least significant bit (LSB) portion, corresponding to least significant bits of said number n, said MSB portion being applied by said control circuit as a first MSB control signal, said control circuit comprising an adder means;
- said adder means receiving and summing subsequently received LSB portions of said signal to provide a running sum, and for providing a second MSB control signal corresponding to an MSB portion of said running sum when said running sum is equal to or greater than m, said adder means further providing a third control signal corresponding to an LSB portion of said running sum;
- bit shifter means for receiving said third control signal, receiving and shifting said parallel data words by a number of bit positions corresponding to said third control signal;
- output register means for receiving and storing up to m data bits from said bit shifter means in a received order, and for providing an m-bit wide packed parallel output word at an occurrence of one of said first and second MSB control signal;
- intermediate register means for receiving and storing up to (m−1) valid data bits from said bit shifter means which are in excess of m valid data bits received and stored by said output register means; and
- output data logic means for enabling transfer of said valid data bits from said intermediate register means to corresponding bit locations of said output register means in response to one of said first and second MSB control signal.

9. An apparatus for packing data, receiving parallel data words arranged in blocks of data, each received data word having a width equal to a variable number of n valid data bits, and providing parallel output data words having a width equal to a fixed number of m data bits pertaining to the same block of data, comprising;
- a control circuit for receiving a signal corresponding to a binary representation of said number n for each received data word, said signal having a most significant bit (MSB) portion when n is equal to or greater than m, and a least significant bit (LSB) portion, corresponding to least significant bits of said number n, said MSB portion being applied by said control circuit as a first MSB control signal, said control circuit comprising an adder means;
- said adder means receiving and summing subsequently received LSB portions of said signal to provide a running sum, and for providing a second MSB control signal corresponding to an MSB portion of said running sum when said running sum is equal to or greater than m, said adder means further providing a third control signal corresponding to an LSB portion of said running sum;
- bit shifter means for receiving said third control signal, receiving and shifting said parallel data words by a number of bit positions corresponding to said third control signal;
- data output means for receiving and storing data bits from said bit shifter means in a received order, and for providing an m-bit wide packed parallel output word at an occurrence of one of said first and second MSB control signal; and
- logic means receiving a BOB control signal indicating receipt by said data packer of a first parallel data word of a new block of data, and in response thereto applying a force control signal to said data output means, to provide an m-bit wide packed parallel output word containing valid data bits pertaining to a preceding block of data, and said logic means setting said third control signal to zero.

* * * * *